Patented Oct. 5, 1948

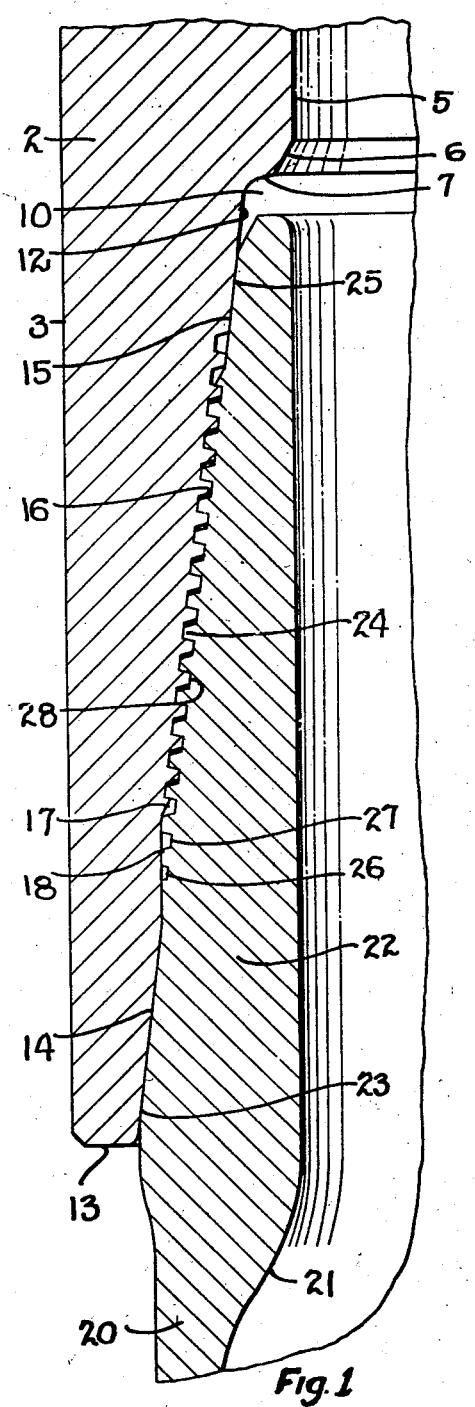
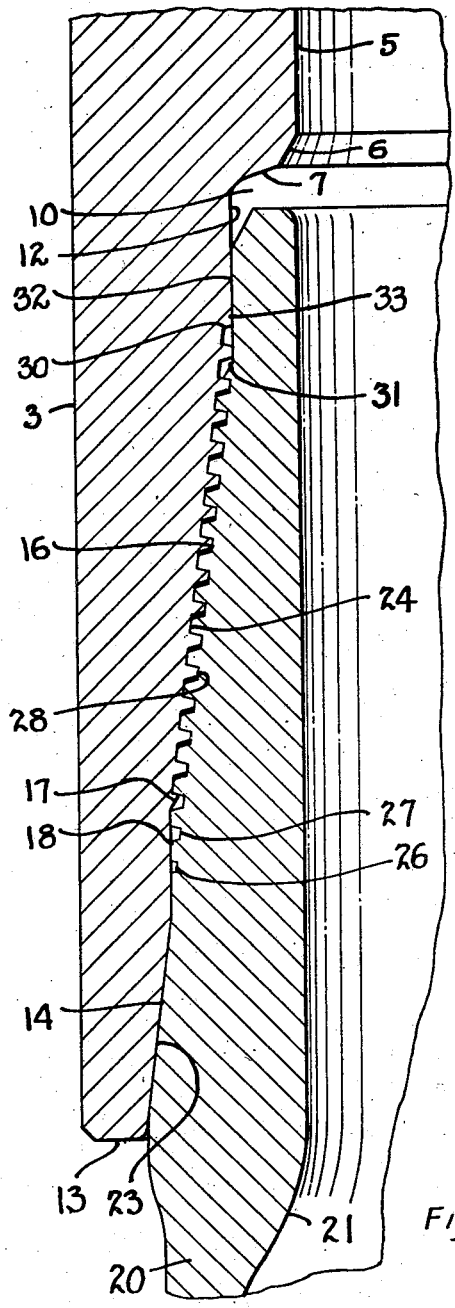

2,450,453

UNITED STATES PATENT OFFICE 2,450,453

DOUBLE SEAL GRIP TOOL JOINT

Milos Emanuel Boehm, Houston, Tex., assignor to Hughes Tool Company, Houston, Tex., a corporation of Delaware Application July 24, 1945, Serial No. 606,836

6 Claims. (Cl. 285—146)

1

The invention relates to a threaded and sealing pipe and tool joint connection.

The present invention relates generally to that type of seal grip tool joint disclosed and claimed in the co-pending application for patent of Floyd L. Scott, Serial No. 547,187, filed July 29, 1944, but constitutes an improvement thereover in the provision of a seal at the inner end of the threaded areas so as to provide a double seal both on the inside and outside of the threaded areas.

A seal at the inner end of the pipe joint is desirable because of the tremendous pressure of the liquid inside the pipe. It will be recalled that the pump pressures may approximate 1,000 to 1,500 pounds per square inch, but that this is augmented by the static pressure due to the weight of the column of mud or liquid in the pipe which in deep wells may be as great as 5,000 or more pounds per square inch and cause leakage and seepage into the threaded areas. Such leakage sets up corrosion and tends to otherwise weaken the threaded connection, and the joint, as well as to cause difficulty in effecting a disconnection.

It is therefore one of the objects of the present invention to provide the combination of a threaded and sealing tool joint pipe connection wherein there are smooth sealing surfaces both on the inside and the outside of the threaded areas so as to isolate such areas against leakage and corrosion.

Another object of the invention is to provide a threaded and sealing tool joint pipe connection wherein the pin on the pipe and the socket on the tool joint are of a uniform taper and constitute smooth surfaces having an intermediate area which is threaded.

A still further object of the invention is to provide a threaded and sealing pipe and tool joint connection wherein two spaced sealing areas are provided on the same tapered surface, one on the inside of the threads and one on the outside of the threads.

A still further object of the invention is to provide a pipe and tool joint threaded and sealing connection wherein a tapered sealing surface is provided at one end of the threaded connection and a cylindrical sealing surface is provided at the other end of the threaded connection.

Other and further objects of the invention will be readily apparent when the following description is considered in connection with the accompanying drawings wherein:

Fig. 1 is an enlarged broken vertical sectional view through a pipe and tool joint connection embodying the invention.

Fig. 2 is a view similar to Fig. 1 but illustrating a modification wherein the inner sealing surface is cylindrical.

In Fig. 1 the tool joint body 2 is a cylindrical body whose outer periphery 3 is usually of a recognized diameter, which is determined by the various limitations of strength of material, size of the bore being drilled, and various other characteristics which prohibit enlargement beyond predetermined limits. This body 2 is, of course, provided with the usual central passage 5, which has the beveled portion 6 thereon and the shoulder 7 which merges into a tapered socket 10.

The socket in the present construction is tapered on a uniform taper so as to provide a circular tapered surface such as 12. This surface extends to the outer end 13 of the tool joint body so as to provide the sealing surfaces such as 14 at the outer end of the socket and 15 at the inner end of the socket. It will be noted that these two surfaces 14 and 15 are on the same taper and constitute a continuation of the same surface 10. The two surfaces 14 and 15 are defined, however, due to the fact that the threaded area 16 has been provided intermediate the ends of the tapered surface 10. The threads 16 are relatively coarse threads and the threaded area is of substantial length so as to provide sufficient contact area to transmit stresses through the connection.

It will be noted that the threads disappear with the partial thread 17 toward the outer end of the socket and that a short cylindrical area 18 merges the root line of the thread 16 with the smooth tapered surface 14.

The pipe 20 may or may not have the upset area 21 thereon so as to provide a thickened portion forming the pin member 22 adjacent the end. This portion 22 is generally known as the pin member or pin end of the pipe and is formed with a tapered surface 23 which is complementary in taper to the tapered surface 12 in the socket 10.

This surface 23 is interrupted by the threaded area 24 on the pin member which threaded area is complementary to the threads 16 in the socket member so as to form a threaded connection between the pipe and the socket. The threads on the taper thus create an internal sealing surface 25 adjacent the end of the pin member 22. The threaded area 24 on the pin member has the threaded area arranged in such a manner that it vanishes at 26 where the root line 27 of the pipe threads serves as a continuation of the tapered surfaces 23 and 25. In other words, the tapered sealing surfaces are on the same inclined surface as the root line 27 of the threads 24. It might be mentioned that this line substantially coincides with the crest line 28 of the threads 16 in the socket.

This arrangement is of advantage because it permits the maximum amount of metal at the outer end 13 of the socket member.

When the connection is to be made up, the socket member is usually heated so as to cause its expansion and then the pin member is threaded thereinto while the socket is hot so that as the socket cools the shrinkage of the metal will form a firm positive sealing connection between the surfaces 23 and 14 adjacent the outer end of the socket beyond the threaded connection and also a tight sealing connection between the surfaces 15 and 25 at the inner end of the threaded area. These two spaced seals serve to isolate the threaded areas 16 and 24 so as to prevent the infiltration of liquid or foreign matter and to also prohibit the corrosion of the surfaces.

The fact that the tapers, both on the inside and the outside of the threaded areas are on the same frusto-conical surface simplifies the cost of construction and facilitates the sealing and service obtainable from joints of this type.

It is important that a seal to isolate the threaded area be provided because the pressure, due to static head in the well could be as high as 7000 pounds per square inch, depending on the depth of the well. In 15,000-foot holes, the pressure would be more than 7500 pound per square inch. In actual practice the threaded connections have a clearance space on the flanks of the threads to allow for lengthwise expansion which takes place when the joint is heated for installation on the pipe. A lubricant is used on the threads, but such lubricant usually contains air bubbles and voids filled with air at the time of the assembly. Thus when a joint is lowered to near the bottom of a 15,000-foot hole a seal must be made against leakage into the threads of the flushing fluid and there may be a difference of a pressure which amounts to practically 7500 pounds per square inch.

Fig. 2 shows a modified form of the invention wherein the taper which constitutes the area for the threads and the outer sealing surface does not begin until the start of the threads, as at 30, in the socket member, and at the start of the threads, as at 31 on the pin member. This construction thus provides a cylindrical sealing surface 32 in the socket and a complementary cylindrical sealing surface 33 on the pin member. This construction is of advantage in that only the tapered faces 14 and 23 need to merge on a taper and so long as the cylindrical area constitutes a tight sealing fit it may simplify the construction cost and provide some advantage in actual operation. The remainder of the construction of Fig. 2 is the same as previously described in connection with Fig. 1.

While the invention has been illustrated and described in detail as applied to a connection where the pin is on the pipe and the socket in the tool joint, it is well understood that these portions are sometimes reversed so that the socket is in the pipe and the pin on the joint. It is contemplated that this invention shall be applied to such a structure as coming within the scope of the description and claims.

Broadly the invention contemplates the combination of spaced sealing surfaces on a pipe and tool joint threaded and sealing connection which surfaces are interrupted by threaded areas in such a manner that the inlet will be protected by both inner and outer seals.

What is claimed is:

1. In a pipe and tool joint pin and socket connection including a socket in the tool joint, said socket having a uniformly tapered inner peripheral surface with spaced smooth end portions and a threaded intermediate area, the crests of the threads of said area being substantially on the line of said taper so that the pin end of the pipe will engage said threaded area and seal with said smooth tapered surface at each end of the threaded area.

2. In a pipe and tool joint pin and socket connection including a pin end on the pipe, said pin having a uniformly tapered peripheral surface with spaced smooth end portions and an intermediate threaded area, the roots of the threads of said area being substantially on the line of said smooth end portions so that the socket of the tool joint will engage said threaded area and seal with said smooth tapered surface at each end of the threaded area.

3. In a pipe and tool joint pin and socket connection including a socket in the tool joint, said socket having a uniformly tapered inner peripheral surface with spaced smooth end portions and a threaded intermediate area, the crests of the threads of said area being substantially on the line of said taper, a pin end on the pipe, said pin having a uniformly tapered peripheral surface with smooth end portions and an intermediate threaded area, the roots of the threads of said area being substantially on the line of said taper, said smooth tapered surfaces and said threaded areas being complementary so as to provide a threaded connection having a seal at both the inside and the outside ends thereof.

4. A pipe and tool joint pin and socket threaded and sealing connection comprising complementary threaded areas on each said pin and socket, a pair of smooth tapered surfaces on the pin and socket to seal the outer ends of the threads when the joint is made up, and an additional pair of smooth surfaces on the pin and socket to seal the inside of said threaded areas, one of said pair of surfaces being tapered on a surface which is the same as the root surface of the pin threads.

5. A pipe and tool joint pin and socket threaded and sealing connection comprising complementary threaded areas on each said pin and socket, a pair of smooth tapered surfaces on the pin and socket to seal the outer ends of the threads when the joint is made up, and an additional pair of smooth surfaces on the pin and socket to seal the inside of said threaded areas, one of said pair of surfaces being tapered on a surface which is the same as the root surface of the pin threads, and the other pair of surfaces being cylindrical.

6. A pipe connection including a pin and socket, said pin comprising a straight tapered surface and a thread projecting outwardly on an intermediate portion of the taper, said socket comprising a straight taper, and a thread formed directly in an intermediate portion of said taper whereby complementary straight tapered portions on each said pin and socket remain to seal the threaded areas when the connection is assembled.

MILOS EMANUEL BOEHM.

(References on following page)

REFERENCES CITED

The following references are of record in the file of this patent:

UNITED STATES PATENTS

| Number | Name | Date |
|---|---|---|
| 1,281,977 | Kelley | Oct. 15, 1918 |
| 1,394,791 | Runyon | Oct. 25, 1921 |
| 1,824,257 | Bull | Sept. 22, 1931 |
| 1,927,656 | Eaton, et al. | Sept. 19, 1933 |
| 1,932,427 | Stone | Oct. 31, 1933 |
| 1,942,518 | Protin | Jan. 9, 1934 |
| 2,054,118 | Childs, et al. | Sept. 5, 1936 |
| 2,062,407 | Eaton | Dec. 1, 1936 |
| 2,211,179 | Stone | Aug. 13, 1940 |
| 2,267,923 | Johnson | Dec. 30, 1941 |
| 2,341,670 | Stinson | Feb. 15, 1944 |